Sept. 21, 1943.    M. P. ROBINSON    2,330,008

WATER TREATING APPARATUS

Filed Oct. 4, 1941

Merrill P. Robinson
INVENTOR

BY *Robt Meyer*
ATTORNEY

Patented Sept. 21, 1943

2,330,008

UNITED STATES PATENT OFFICE 2,330,008

WATER TREATING APPARATUS

Merrill P. Robinson, Upper Montclair, N. J., assignor to Worthington Pump and Machinery Corporation, Harrison, N. J., a corporation of Delaware Application October 4, 1941, Serial No. 413,576

3 Claims. (Cl. 210—58)

This invention relates to water treating apparatus, and more particularly to precipitating type softeners for water purification.

An object of the present invention is the provision of means for preventing turbulence in the treated water as it passes through the outlet cone of the apparatus.

With these and other objects in view, as may appear from the accompanying specification, the invention consists of various features of construction and combination of parts, which will be first described in connection with the accompanying drawings, showing a water treating apparatus of the preferred form embodying the invention, and the features forming the invention will be specifically pointed out in the claims.

Figure 1:
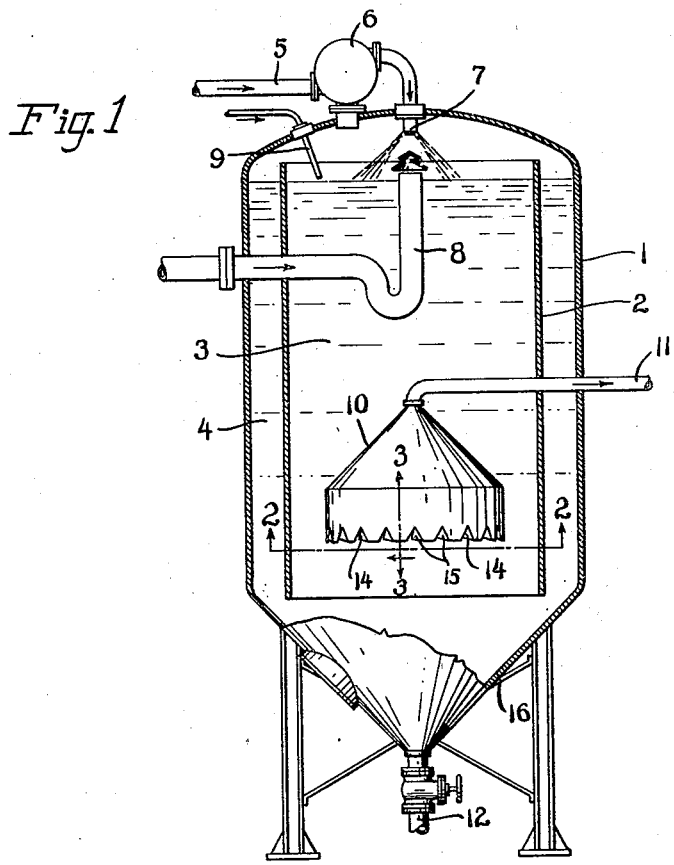
Figure 1 is a vertical section through a water treating apparatus constructed in accordance with the present invention.

Referring more particularly to the drawing, the water softening apparatus includes the tank 1 which in the type of apparatus shown in the drawing has a concentric partition 2 therein forming a water treatment chamber 3 and a filter wash water settling and supply compartment 4. The present invention, however, is not limited to any particular construction of tank, but is adaptable for use in connection with various types of water treatment apparatus.

In the apparatus shown in the drawing, which is a hot process water softening apparatus, the raw water to be treated enters the treatment chamber 3 through the raw water inlet 5, vent condenser 6 to the spray valve 7, where it contacts with heating steam entering the apparatus through the steam inlet 8.

In water treating apparatus of this type the chemical re-agent enters the apparatus through the chemical inlet 9 and the heated raw water is treated by the re-agent in the treatment chamber 3, causing a separating out of the precipitate and softening of the water. The softened water passes downwardly in the treatment chamber 3 and out of the treatment chamber through the outlet cone 10. The outlet cone 10 has its bottom open, the treated water passing across the lower peripheral edge of the cone and upwardly into the cone, out through the outlet pipe 11 either to a filter (not shown) or other point of use.

The outlet cone 10 changes the direction of flow of the water and the precipitate is thus permitted to separate and settle into the conical bottom 16 of the tank, from which it is drawn off by means of a suitable outlet 12.

Figure 2:
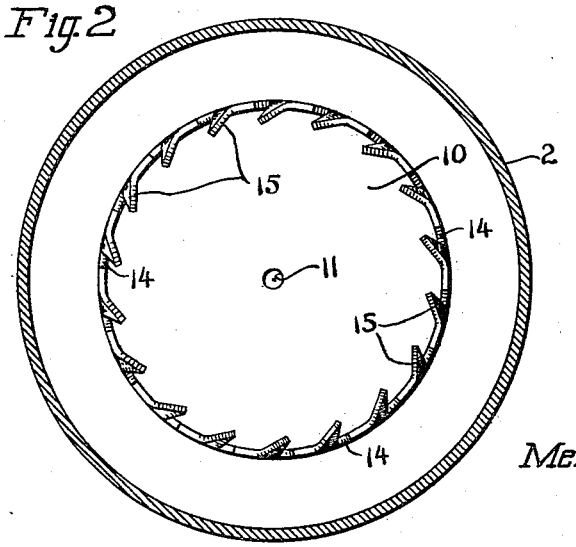
Figure 2 is a horizontal section on the line 2—2 of Figure 1.
Figure 3:
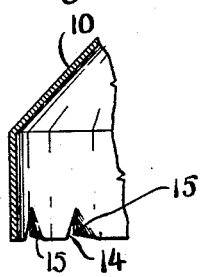
Figure 3 is a fragmentary vertical section taken on the line 3—3 of Figure 1.

The periphery of the cone 10 at its inlet end, or lower edge, is provided with a plurality of notches 14, cut therein for the purpose of equalizing the draft of the cone and causing a uniform flow of the treated, settled water into the cone. Owing to the head of water in the treatment chamber 3, some of the water flows with considerable force through the notches 14 into the cone and unless means are provided as a preventative, the various streams of water formed by the notches, flowing into the cone, create an undesirable turbulence in the water in the cone, tending to set up eddies, interfering with the maximum separation of the precipitate. In the present invention the portion of the periphery of the cone 10 which is cut to provide the notches 14 is bent inwardly, as shown in Figures 2 and 3 of the drawing, providing directional vanes for guiding the water as it enters the cone, causing it to travel in a circumferential path, so that a rotary horizontal movement is imparted to the water within the cone.

As shown in the drawing, the attached ends of the vanes 15 are bent on an angle, so that the resultant notches are substantially of an inverted V shape, and also so that the vanes project inwardly into the outlet cone 10 to provide for proper directional guiding of the inflowing water.

It will be understood that the invention is not to be limited to the specific construction or arrangement of parts shown, but that they may be widely modified within the invention defined by the claims.

What is claimed is:

1. In a water softener for water purification, a tank forming a water treating chamber, means for delivering water to be treated to said chamber, means for delivering chemical reagent to said chamber, an outlet cone, outlet means for treated water connected to said outlet cone, said cone being positioned in said chamber and arranged to change the direction of flow of the treated water, said cone being serrated at its inlet periphery to equalize its draft, and means in said cone inwardly of and in close proximity to said serrations to set up centrifugal flow of water in the cone and prevent turbulence and the setting up of eddies in the water flowing through the cone.

2. In a water treating apparatus for water purification, a tank forming a water treating chamber, means for delivering water to be treated to said chamber, means for delivering chemical reagent to said chamber, an outlet cone in said chamber arranged to change the direction of flow of treated water and having its bottom open for inlet of water into the cone, outlet means for treated water connected to said cone, portions of the bottom edge of said cone being cut away in its inlet periphery to equalize the draft of the cone, said cutting away portions of the cone being bent inwardly tangentially of the perimeter of the cone to form flow guide vanes to direct the flow of water through the cone.

3. In a hot process water softener for water purification, a tank forming a water treating chamber, means for delivering water to be treated to said chamber, means for delivering chemical reagent to said chamber, an outlet cone in said chamber arranged to change the direction of flow of the treated water, outlet means for treated water connected to said cone, steam inlet means connected to said chamber, vanes carried by said cone inwardly of the perimeter of the bottom inlet of the cone to form flow guiding vanes to direct the water through the cone in a centrifugal spiral path.

MERRILL P. ROBINSON.